(12) United States Patent
Qiu et al.

(10) Patent No.: US 10,936,705 B2
(45) Date of Patent: Mar. 2, 2021

(54) AUTHENTICATION METHOD, ELECTRONIC DEVICE, AND COMPUTER-READABLE PROGRAM MEDIUM

(71) Applicant: Baidu USA LLC, Sunnyvale, CA (US)

(72) Inventors: Zhebin Qiu, Shanghai (CN); Tao Wei, Sunnyvale, CA (US); Zhenyu Zhong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 144 days.

(21) Appl. No.: 15/799,563

(22) Filed: Oct. 31, 2017

(65) Prior Publication Data

US 2019/0130084 A1 May 2, 2019

(51) Int. Cl.
| | |
|---|---|
| G06F 21/32 | (2013.01) |
| H04L 29/06 | (2006.01) |
| G10L 17/06 | (2013.01) |
| G10L 15/25 | (2013.01) |
| G10L 15/18 | (2013.01) |
| G06K 9/00 | (2006.01) |

(52) U.S. Cl.
CPC ......... *G06F 21/32* (2013.01); *G06K 9/00288* (2013.01); *G06K 9/00335* (2013.01); *G06K 9/00892* (2013.01); *G10L 15/1822* (2013.01); *G10L 15/25* (2013.01); *G10L 17/06* (2013.01); *H04L 63/0861* (2013.01)

(58) Field of Classification Search
CPC ........................................................ G06F 21/32

USPC ............................................................ 726/7
See application file for complete search history.

(56) References Cited

U.S. PATENT DOCUMENTS

| | | | | |
|---|---|---|---|---|
| 5,761,329 A | * | 6/1998 | Chen .................. | G06K 9/00892 382/116 |
| 9,141,150 B1 | * | 9/2015 | Trundle .................. | G06F 21/32 |
| 2007/0183633 A1 | * | 8/2007 | Hoffmann .......... | G06K 9/00221 382/116 |
| 2010/0017209 A1 | * | 1/2010 | Yu .......................... | H04L 9/0662 704/246 |
| 2013/0227678 A1 | * | 8/2013 | Kang .................. | G06K 9/00335 726/19 |
| 2016/0093129 A1 | * | 3/2016 | Jelavic .................... | G06F 21/32 340/5.52 |
| 2019/0130084 A1 | * | 5/2019 | Qiu .......................... | G10L 17/06 |
| 2020/0074058 A1 | * | 3/2020 | Son ....................... | G06N 3/0454 |

* cited by examiner

Primary Examiner — Harris C Wang
(74) Attorney, Agent, or Firm — Seed IP Law Group LLP (57) ABSTRACT

Embodiments of the present disclosure disclose an authentication method, an electronic device, and a computer-readable program medium. A specific embodiment of the method comprises: acquiring multimedia input information of a user in response to receiving an authentication request from the user; parsing the multimedia input information to obtain a parsing result; authenticating the user based on the parsing result; and transmitting an authentication result to the user; wherein the multimedia input information includes human face video input information and voice input information of the user; and the parsing result includes at least two of: biometric feature information of the user, voice content information, and behavior feature information of the user. The embodiments may lower a risk that a hacker forges the information for authentication inputted by the user.

8 Claims, 8 Drawing Sheets

AUTHENTICATION METHOD, ELECTRONIC DEVICE, AND COMPUTER-READABLE PROGRAM MEDIUM

TECHNICAL FIELD

Embodiments of the present disclosure relate to the field of computer technologies, specifically to the field of information security technologies, and more particularly to an authentication method, an electronic device, and a computer-readable program medium.

BACKGROUND

Authentication refers to an operation for verifying whether a user has a right to access a system.

A traditional authentication usually performs verification through a password. A precondition for this approach is that each user acquiring the password has been authorized. When establishing a user, the user will be assigned a password, which may be specified by an administrator or voluntarily applied for by the user.

By authenticating with a password, a problem of "what do you know" may be solved.

SUMMARY

Embodiments of the present disclosure provide an authentication method, an electronic device, and a computer-readable program medium.

In a first aspect, an embodiment of the present disclosure provides an authentication method, comprising: acquiring multimedia input information of a user in response to receiving an authentication request from the user; parsing the multimedia input information to obtain a parsing result; authenticating the user based on the parsing result; and transmitting an authentication result to the user; wherein the multimedia input information includes human face video input information and voice input information of the user; and the parsing result includes at least two of: biometric feature information of the user, voice content information, and behavior feature information of the user.

In some embodiments, before the acquiring multimedia input information of a user in response to receiving an authentication request from the user, the method further comprises: acquiring multimedia reference information inputted by the user; extracting authentication reference information from the multimedia reference information; and saving the authentication reference information in a pre-created database.

In some embodiments, the multimedia reference information includes human face reference image information of the user and voice reference information of the user; the authentication reference information includes human face feature reference information of the user and/or voice feature reference information of the user.

In some embodiments, the parsing result includes the biometric feature information of the user, and the behavior feature information of the user; the authenticating the user based on the parsing result comprises: determining whether the biometric feature information of the user matches the authentication reference information; determining whether the behavior feature information of the user matches the voice input information; and determining that the user passes authentication in response to the biometric feature information of the user matching the authentication reference information and the behavior feature information of the user matching the voice input information.

In some embodiments, the behavior feature information of the user includes lip motion feature information of the user; the parsing the multimedia input information to obtain a parsing result comprises: inputting the human face video input information into a pre-trained lip motion feature extracting model to obtain a lip motion feature information of the user; and inputting the voice input information into a pre-trained voice content feature extracting model to obtain voice content feature information of the user; and determining whether the behavior feature information of the user matches the voice input information comprises: determining whether the lip motion feature information matches the voice content feature information.

In some embodiment, the acquiring multimedia input information of a user in response to receiving an authentication request from the user further comprises: randomly generating voice reference information and presenting the voice reference information on an interaction interface.

In some embodiments, the parsing result further includes the voice content information; the authentication reference information further includes voice content reference information; and the authenticating the user based on the parsing result further comprises: determining whether the voice content information matches the voice content reference information; and determining that the user passes authentication in response to the biometric feature information of the user matching the authentication reference information, the behavior feature information of the user matching the voice content information, and the voice content information matching the voice content reference information.

In some embodiments, the parsing result includes the biometric feature information of the user and the voice content information; the authentication reference information further includes the voice content reference information; and the authenticating the user based on the parsing result comprises: determining whether the biometric feature information of the user matches the authentication reference information; determining whether the voice content information matches the voice content reference information; and determining that the user passes authentication in response to the biometric feature information of the user matching the authentication reference information and the voice content information matching the voice content reference information.

In some embodiments, the parsing result includes the voice content information and the behavior feature information of the user; the authentication reference information further includes the voice content reference information; and the authenticating the user based on the parsing result comprises: determining whether the voice content information matches the voice content reference information; determining whether the user behavior feature information of the user matches the voice content information; and determining that the user passes authentication in response to the voice content information matching the voice content reference information and the behavior feature information of the user matching the voice content information.

In some embodiments, the authenticating the user based on the parsing result comprises: transmitting the parsing result to a server such that the server authenticates the user based on the parsing result; and transmitting an authenticating result to the user comprises: receiving the authentication result transmitted by the user and transmitting the received authentication result to the user.

In a second aspect, an embodiment of the present disclosure provides an electronic device, the electronic device comprising: one or more processors; a storage storing one or more programs which, when being executed by the one or more processors, cause the one or more processors to implement the method described according to any embodiment in the first aspect.

In a third aspect, an embodiment of the present disclosure provides a computer readable storage medium having a computer program embodied thereon, wherein the computer program, when being executed by a processor, causes the processor to implement the method described according to any embodiment in the first aspect.

The authentication method, the electronic device, and the computer-readable program medium provided by the embodiments of the present disclosure may lower a risk that a hacker forges the information for authentication inputted by the user by parsing the multimedia input information to obtain a parsing result; authenticating the user based on the parsing result; and transmitting an authentication result to the user; wherein the multimedia input information includes human face video input information and voice input information of the user; and the parsing result includes at least two of: biometric feature information of the user, voice content information, and behavior feature information of the user.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and embodiments. It will be appreciated that the preferred embodiments described herein are only for explaining the present disclosure, not for limiting the present disclosure. In addition, it should also be noted that for the ease of description, the drawings only illustrate those parts related to the present disclosure.

It should be noted that without conflict, the embodiments in the present disclosure and the features in the embodiments may be combined mutually. Hereinafter, the present disclosure will be illustrated in detail with reference to the accompanying drawings in conjunction with the embodiments.

Figure 1:
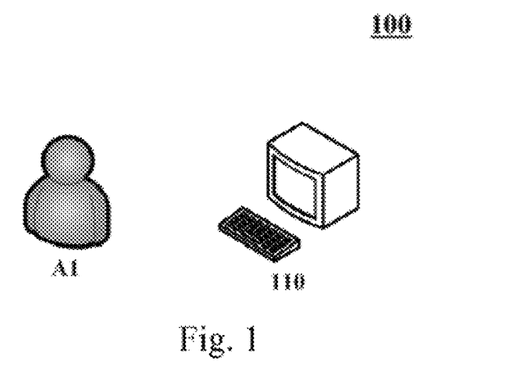
FIG. 1 is an exemplary system architecture diagram in which the present disclosure may be applied.

FIG. 1 shows an exemplary system architecture 100 in which an embodiment of an authentication method or an authentication apparatus of the present disclosure may be applied.

As illustrated in FIG. 1, the system architecture 100 may comprise an electronic device 101. The electronic device 101 for example may be a terminal device with a display screen available for a user A1 to use. At least one application (App) may be installed in the electronic device 101.

When the user A1 wishes to unlock the electronic device 101 or wishes to use an application installed thereon, he or she may interact with the electronic device through a human-machine interaction interface, thereby completing a process of authentication. If the user A1 passes the authentication, the user may unlock the electronic device 101 and/or use an application installed thereon; otherwise, the user cannot unlock the electronic device 101 and/or cannot use the application installed thereon.

When a system in which the authentication method or the authentication apparatus of the present disclosure is applied has the architecture shown in FIG. 1, the authentication method provided by an embodiment of the present disclosure may be executed by the electronic device 101; correspondingly, the authentication apparatus may also be provided in the electronic device 101.

Figure 2:
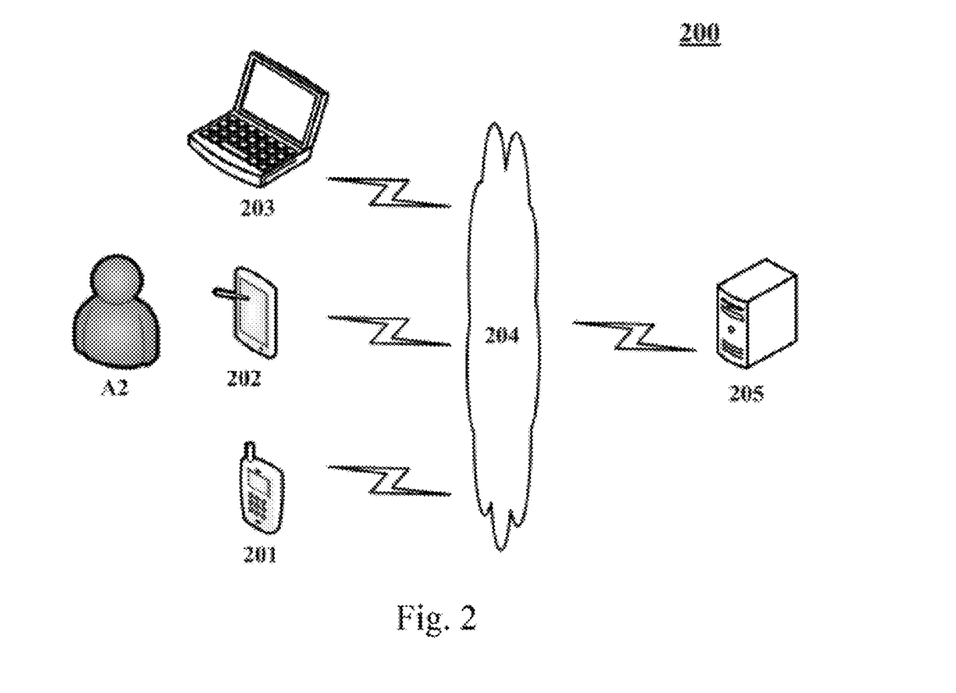
FIG. 2 is another exemplary system architecture in which the present disclosure may be applied.

FIG. 2 shows another exemplary system architecture 200 in which another embodiment of an authentication method or an authentication apparatus of the present disclosure may be applied.

As shown in FIG. 2, the system architecture 200 may comprise a terminal device 201, 202, 203, a network 204, and a server 205. The network 204 is a medium for providing a communication link between the terminal device 201, 202, 203, and the server 205. The network 204 may include various kinds of connection types, e.g., a wired communication link, a wireless communication link, or an optical cable, etc.

A user A2 may receive or transmit messages by interaction between the terminal device 201, 202, 203 and the server 205 over the network 204. Various kinds of communication client applications may be installed on the terminal device 201, 202, 203, e.g., webpage browser applications, shopping applications, search applications, instant messaging tools, email clients, and social platform software, etc.

The terminal device 201, 202, 203 may be various kinds of human-machine interaction-enabled electronic devices with a display screen, including, but not limited to, a smart phone, a tablet computer, an electronic reader, an MP3 (Moving Picture Experts Group Audio Layer III) player, an MP4 (Moving Picture Experts Group Audio Layer IV) player, a laptop computer, and a desktop computer, etc.

The server 205 may be a server that provides various kinds of services, e.g., an authentication server that supports a human-machine interaction interface for authentication as displayed on the terminal device 201, 202, 203. The authentication server may perform processing (such as analysis) to data such as a received authentication request, and report back a processing result (e.g., an authentication result) to the terminal devices.

When the system in which the authentication method or authentication apparatus of the present disclosure is applied has the architecture shown in FIG. 2, the authentication method provided by an embodiment of the present disclosure may be executed by the terminal device 201, 202, 203, or may be executed by the server 205, or part thereof is executed by the terminal device 201, 202, 203 and the other part thereof is executed by the server 205. Correspondingly, the authentication apparatus may be provided in the terminal device 201, 202, 203, or provided in the server 204, or part thereof is provided in the terminal device 201, 202, 203 while the other part thereof is provided in the server 205.

It should be understood that the numbers of the terminal devices 201, 202, 203, network 204, and server 205 in FIG. 2 are only schematic. Any numbers of terminal devices, networks, and servers may be provided according to needs of implementation.

Figure 3:
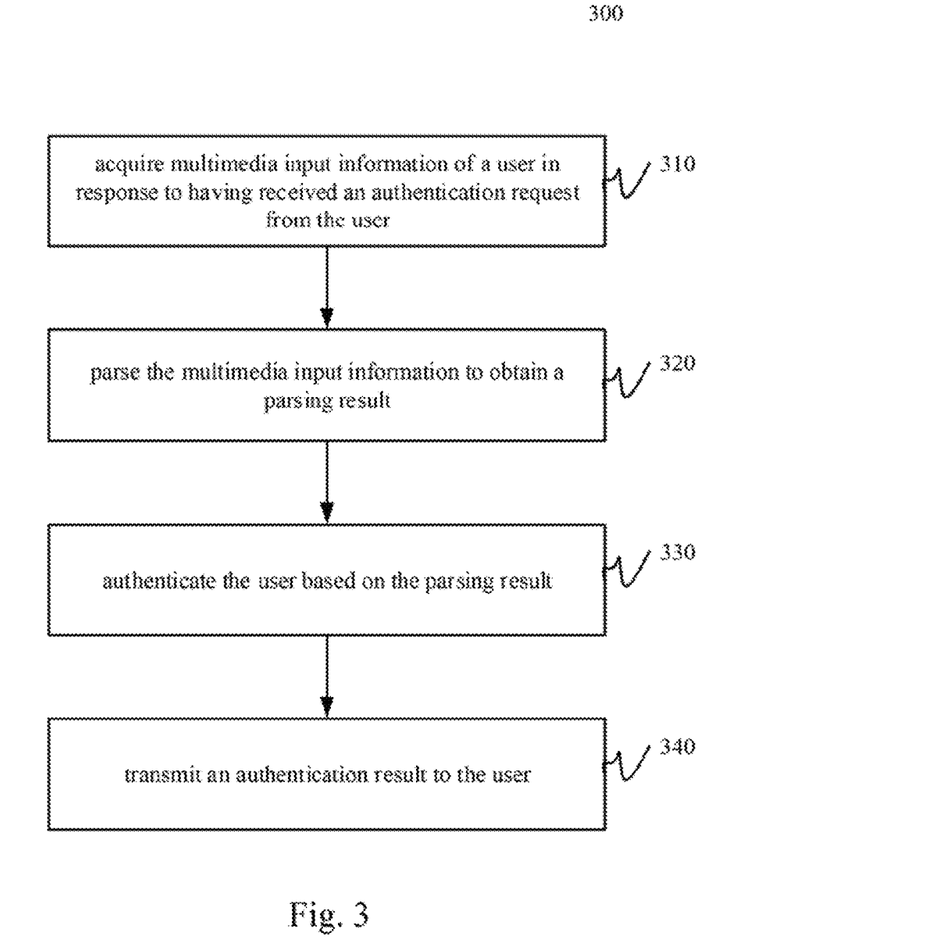
FIG. 3 is a schematic flow diagram of an embodiment of an authentication method of the present disclosure.

Continue referring to FIG. 3, which shows a flow 300 of an embodiment of an authentication method according to the present disclosure. The authentication method comprises steps of:

Step 310: acquiring multimedia input information of a user in response to receiving an authentication request from the user. The multimedia input information includes human face video input information and voice input information of the user.

Here, an electronic device on which the authentication method is applied according to the present embodiment (e.g., the electronic device 110 in the system architecture shown in FIG. 1, or any terminal device 201, 202, 203 in the system architecture shown in FIG. 2) may have a multimedia acquiring module; or, the electronic device in which the authentication method of the present embodiment is applied may be communicatively connected with a certain multimedia acquiring device over a wired or wireless network. Here, a specific manner of the wired or wireless communication connection may include any existing or to-be-developed future connection mode. In some application scenarios, the multimedia acquiring module for example may include, but not limited to, a camera, a microphone, etc.

When the electronic device receives an authentication request from a user, the electronic device may open the multimedia acquiring module thereon or control the multimedia acquiring device in communicative connection therewith to be opened to thereby acquire the multimedia input information of the user.

The user may initiate an authentication request through a human-machine interaction interface presented on a screen of the electronic device. In some application scenarios, after the electronic device opens a multimedia acquiring module or a multimedia acquiring device, images acquired in real time by the multimedia acquiring module or multimedia acquiring device may be presented on the human-machine interaction interface to be available for the user as a reference to adjust his/her own position and/or posture.

In addition, in some application scenarios, a multimedia play module or a multimedia play device in communicative connection therewith may be provided on the electronic device. After receiving the authentication request from the user, the electronic device may open the multimedia play module or the multimedia play device to play the voice received by the multimedia acquiring module or the multimedia acquiring device, to be available for the user as a reference to adjust his/her voice input volume and/or a relative position between his/her mouth and the multimedia acquiring module or multimedia acquiring device, etc.

Step 320: parsing the multimedia input information to obtain a parsing result, wherein the parsing result may include at least two of the following: biometric feature information of the user, voice content information, and behavior feature information of the user.

Here, the biometric feature information of the user, for example, may be understood as information that may characterize inherent features of the user per se. For example, a facial feature, a voice feature, an iris feature, and a fingerprint feature of the user may be used as the biometric feature of the user. On the contrary, information that characterizes the user's non-inherent features, e.g., a feature of the clothes worn by the user, a feature of whether to wear eyeglasses, etc., is inappropriate as the user's biometric features.

Here, the parsed voice content information may have a plurality of representations. For example, in some application scenarios, the parsed voice content information may be transcripts obtained from voice recognition, the transcripts corresponding to respective syllables in the voice input information in the multimedia input information inputted by the user. Or, in some other application scenarios, the parsed voice content information may be a voice feature extracted from the voice input information through machine learning. Such extracted voice features may have or do not have a practical physical meaning, but the extracted voice features may correspond to the content of the voice input information.

In addition, the behavior feature information of the user may be understood as information in the multimedia input information which may reflect behavior features of the user. For example, the behavior feature information of the user may include, but not limited to at least one of the following: a feature of whether the user has a mouth motion in the video information of the multimedia input information; a feature of whether the user has a body motion in the video information of the multimedia input information, etc.

Step 330: authenticating the user based on a parsing result.

In some optional implementations, whether the user passes the authentication may be determined by comparing the parsing result with a preset authentication reference.

In such optional implementations, the preset authentication reference may be objective and user-independent (e.g., the Mel Frequency Cepstrum Coefficient of a user voice is within a preset value range); or, the preset authentication reference may also be user-dependent (e.g., may be obtained based on the user's pre-input processing).

Step 340: transmitting an authentication result to the user.

Here, the authentication result may be any conclusion information that may reflect whether the user passes the authentication, which may have any user-perceptible representation manner.

In some application scenarios, the authentication result may be represented in a user-visible manner. For example, prompt information prompting whether the user passes the authentication may be presented on the human-machine interaction interface. Or, if the authentication result is that the user passes the authentication, the human-machine interaction interface is redirected to an interface desired to be presented by the user after the authentication passes; otherwise, if the authentication result is that the user fails the authentication, the human-machine interaction interface is redirected to an interface prompting that the user fails the authentication, or an interface prompting the user to re-perform the authentication.

In some application scenarios, the authentication result may be represented in a manner that may be sensed by the user through tactile perception. For example, if the authentication result is that the user fails the authentication, the electronic device may prompt the user by vibration.

The authentication method in the present embodiment may solve at least two issues among "what do you have", "what do you know" and "how do you behave" during the authentication process by parsing the multimedia input information inputted by the user and authenticating the user based on the parsing result, the parsing result including at least two of: biometric feature information of the user, voice content information, and behavior feature information of the user. Specifically, the authentication with the biometric feature information may solve the issue of "what do you have"; the authentication with the voice content information may solve the issue of "what do you know"; while the authentication with the behavior feature information may solve the issue of "how do you behave."

In this way, the risk that the information for authentication as inputted by the user is easily forged by a hacker may be lowered in the case of a single authentication ground (e.g., only adopting one of the biometric feature information of the user, the voice content information, and the behavior feature information of the user).

In some optional implementations, before acquiring multimedia input information of a user in response to receiving an authentication request from the user (i.e., step 310 of the present embodiment), the authentication method of the present embodiment may further comprise:

Step 350: acquiring the multimedia reference information inputted by the user. Here, the multimedia reference information for example may include human face reference image information of the user and voice reference information of the user.

Step 360: extracting authentication reference information from the multimedia reference information. Here, the authentication reference information may be any information that may be extracted from the multimedia reference information and may play a reference role for the authentication.

For example, in some application scenarios, the authentication reference information may include human face feature reference information of the user extracted from the human face reference image information in the multimedia reference information.

Or, in some application scenarios, the authentication reference information may include voice feature reference information of the user extracted from the voice reference information in the multimedia reference information.

Or, in some application scenarios, the authentication reference information may not only include human face feature reference information of the user extracted from the human face reference image information in the multimedia reference information, but also include voice feature reference information of the user extracted from the voice reference information in the multimedia reference information.

Step 370: saving the authentication reference information to a pre-created database.

Here, the pre-created database may be saved locally at the electronic device in which the authentication method of the present embodiment is applied, or may be saved on another electronic device that may be communicatively connected with the electronic device in which the authentication method of the present embodiment is applied.

In some embodiments, in the pre-created database, the authentication reference information may be stored in association with the user. For example, in the database, a unique identifier is assigned to each user, the identifier being used as a pointer for the authentication reference information of the user.

Or, in some other application scenarios, the pre-created database may only store the authentication reference information without storing the corresponding user identity information.

Figure 4:
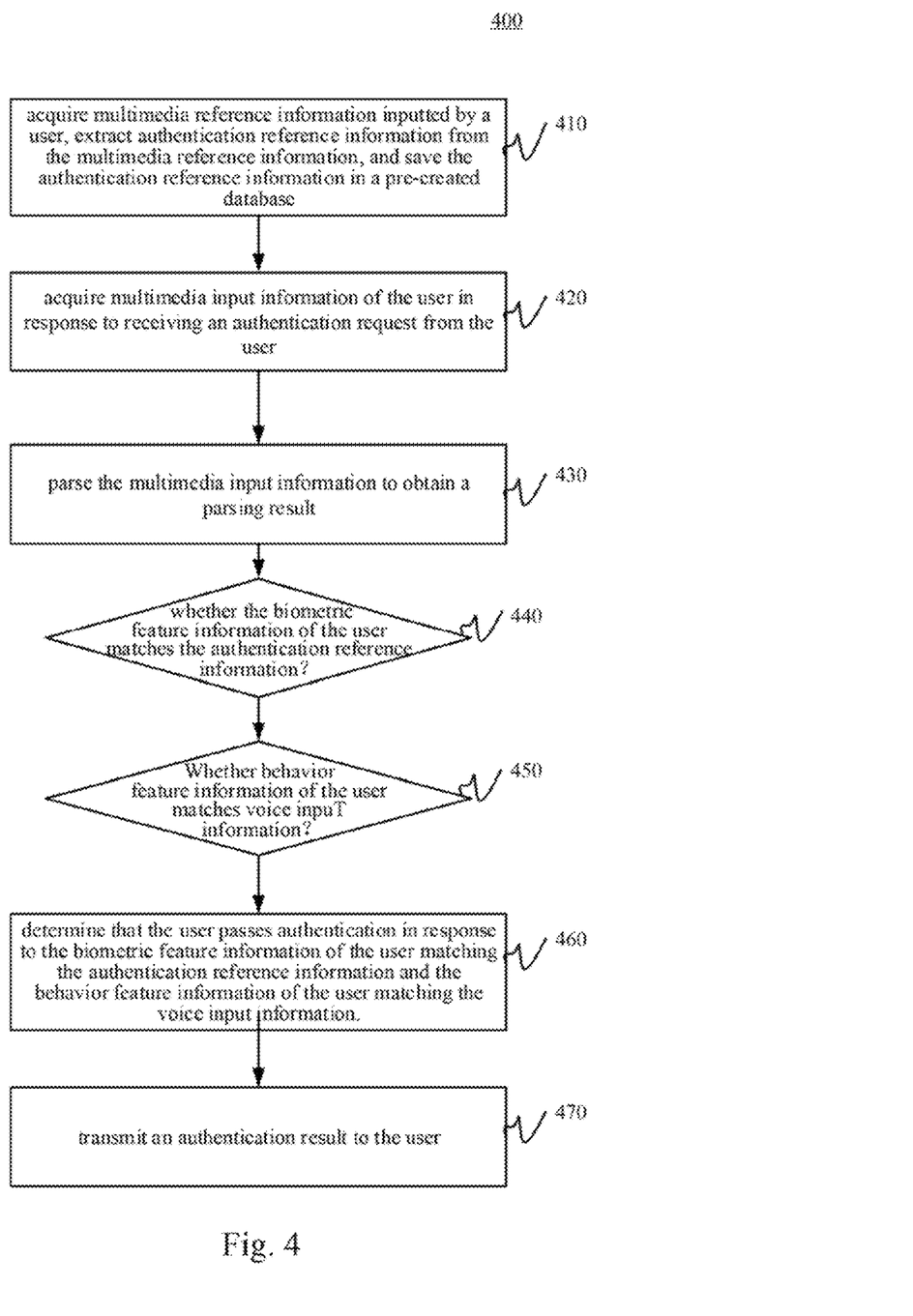
FIG. 4 is schematic flow diagram of another embodiment of an authentication method of the present disclosure.

Refer to FIG. 4, which is a schematic flow diagram 400 of another embodiment of an authentication method of the present disclosure.

Step 410: acquiring multimedia reference information inputted by a user, extracting authentication reference information from the multimedia reference information, and saving the authentication reference information in a pre-created database.

A mode of executing this step may be similar to the above steps 350~370, which is thus not detailed here.

Step 420: acquiring multimedia input information of the user in response to receiving an authentication request from the user. A mode of executing this step may be similar to the step 310 in the embodiment shown in FIG. 3, which is thus not detailed here.

Step 430: parsing the multimedia input information to obtain a parsing result. Different from the embodiment shown in FIG. 3, the parsing result in the present embodiment includes biometric feature information of the user and behavior feature information of the user.

Step 440: determining whether the biometric feature information of the user matches the authentication reference information.

In some optional implementations, if the authentication reference information is stored in the pre-created database; then here, that "the biometric feature information of the user matches the authentication reference information" may be understood as: in the pre-created database, exists a feature identical to the parsed biometric feature information of the user as parsed in the step 430.

Step 450: determining whether behavior feature information of the user matches voice content information.

For example, in some application scenarios, it may be determined whether a facial expression feature of the user matches the voice content information. For example, whether there exists a motion feature characterizing a facial expression (such as blinking, frowning, etc.) that is apparently contradictory to the voice content information.

It needs to be noted that in the present embodiment, the step 440 and the step 450 may be executed simultaneously or executed sequentially; moreover, the execution sequences thereof are not limited.

Step 460: determining that the user passes authentication in response to the biometric feature information of the user matching the authentication reference information and the behavior feature information of the user matching the voice content information.

It may be seen from this step that the user passing the authentication can only be determined when the determining results in the step 440 and the step 550 are both positive.

Step 470: transmitting an authentication result to the user.

As illustrated in the embodiment shown in FIG. 3, by determining whether the biometric feature information of the user matches the authentication reference information, the issue of "what do you have" during the authentication process may be solved, while by determining whether the behavior feature information of the user matches the voice content information, the issue of "how do you behave" may be solved. Their cooperation may lower the risk that that a hacker forges the information for authentication inputted by the user when performing authentication with a single authentication ground.

In some optional implementations, the step 430 of parsing the multimedia input information to obtain a parsing result in the present embodiment may further comprise:

Step 431: inputting human face video input information into a pre-trained lip motion feature extracting model to obtain lip motion feature information of the user;

and step 432: inputting voice input information into a pre-trained voice content feature extracting model to obtain voice content feature information of the user.

In these optional implementations, the step 450 of determining whether the behavior feature information of the user matches the voice content information may further comprise:

Step 451: determining whether the lip motion feature information matches voice content feature information.

In these optional implementations, whether the human face video input information in the multimedia input information of the user matches the voice input information may be determined by comparing the lip motion feature information and the voice content feature information. In other words, whether a human face in the human face video information belongs to the living user can be determined by comparing the lip motion feature information and the voice content feature information. In this way, such a situation may be avoided that the electronic device on which the authentication method of the present embodiment is applied mistakes a hacker as the authenticated user due to misjudgment when the hacker forges the human face video input information of the user with the user's picture or the user's human face video stolen from other approaches.

In some optional implementations of the embodiment shown in FIG. 3 and the embodiment shown in FIG. 4, the acquiring the multimedia input information of the user in response to receiving the authentication request from the user in step 310 and step 420 may further comprise:

randomly generating voice reference information and presenting the voice reference information on an interaction interface.

In these optional implementations, for example, the electronic device on which the authentication method is applied may present the randomly generated voice reference information on an interaction interface through which the user interacts with the electronic device after receiving the authentication request from the user; in this way, the user's multimedia input information may be multimedia information generated when the user reads the randomly generated voice reference information.

In some application scenarios, the randomly generated voice reference information for example may be one or more words and/or phrases. Or, in some other application scenarios, the randomly generated voice reference information, for example, may be one or more sentences.

In these optional implementations, because the voice reference information is randomly generated, it may be avoided that the hacker pre-acquires the voice reference information in an illegal way, which facilitates enhancing the accuracy of the authentication result.

In some optional implementations of the present embodiment, the parsing result obtained from the parsing in step 430 may further include the voice content information.

In these optional implementations, the authentication reference information may further include voice content reference information. When authenticating the user based on the parsing result, it may be further determined whether the voice content information matches the voice content reference information. If the biometric feature information of the user matches the authentication reference information, the behavior feature information of the user matches the voice content information, and the voice content information matches the voice content reference information, it is determined that the user passes authentication.

In this way, the authentication process may simultaneously solve the three issues: "what do you have", "what do you know", and "how do you behave," thereby further lowering the risk caused by the information for authentication being forged by a hacker.

Figure 5:
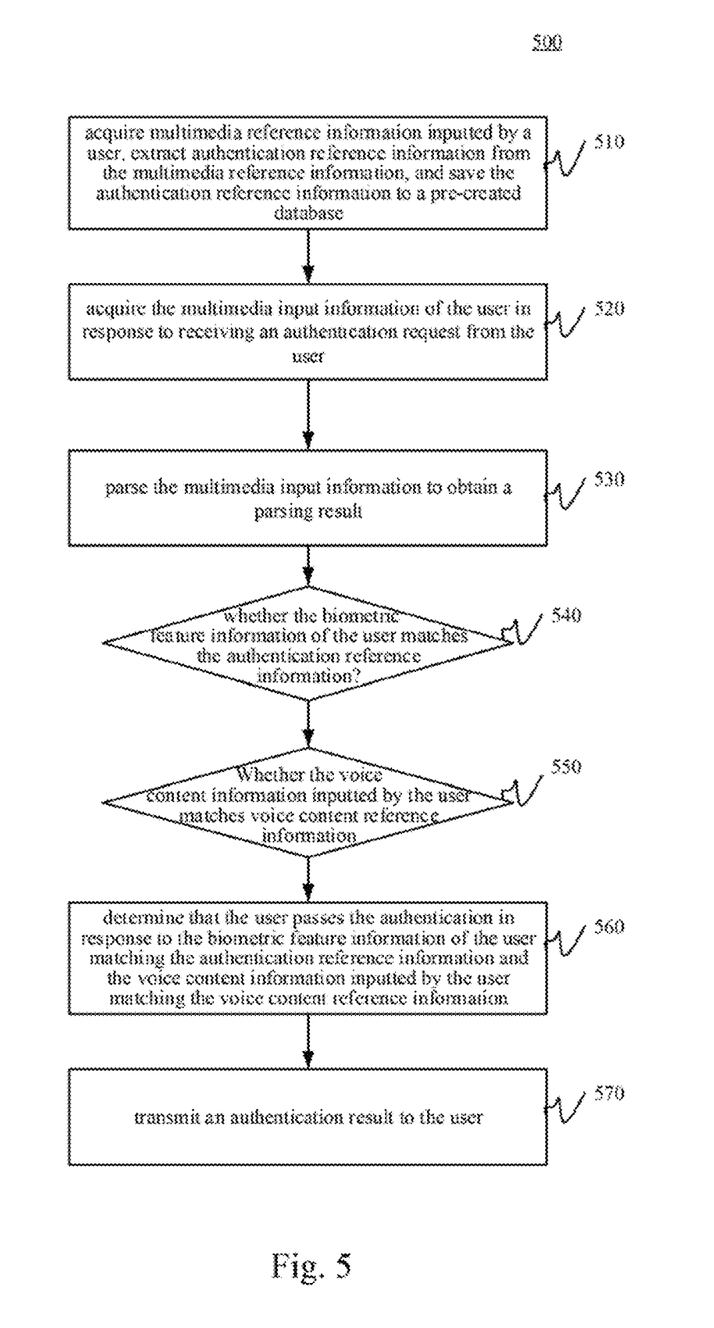
FIG. 5 is schematic flow diagram of a further embodiment of an authentication method of the present disclosure.

Refer to FIG. 5, which shows a schematic flow diagram 500 of a further embodiment of an authentication method of the present disclosure.

The authentication method of the present embodiment comprises:

Step 510: acquiring multimedia reference information inputted by a user, extracting authentication reference information from the multimedia reference information, and saving the authentication reference information to a pre-created database.

The executing manner of this step is similar to the steps 350~370, which is thus not detailed here. The difference lies in that the authentication reference information of the present step further includes voice content reference information.

Step 520: acquiring the multimedia input information of the user in response to receiving an authentication request from the user. The executing manner of this step is similar to step 310 in the embodiment of FIG. 3, which is thus not detailed here.

Step 530: parsing the multimedia input information to obtain a parsing result. Different from the embodiment of FIG. 3, the parsing result in the present embodiment includes biometric feature information of the user and voice content information.

Step 540: determining whether the biometric feature information of the user matches the authentication reference information. Here, the manner of determining whether the biometric feature information of the user matches the authentication reference information is similar to step 440 in the embodiment shown in FIG. 4.

Step 550: determining whether the voice content information matches voice content reference information.

In some application scenarios, in step 510 of the present embodiment, when the multimedia reference information inputted by the user may be acquired by a multimedia acquiring module of the electronic device or a multimedia acquiring device in communicative connection with the electronic device when the user is reading a pre-agreed "code word". In these application scenarios, when authenticating, it may be determined whether the voice content information inputted by the current user is the pre-agreed "code word" using the present step 550.

It needs to be noted that in the present embodiment, the step 540 and the step 550 may be executed simultaneously or sequentially; moreover, their execution sequences are not limited.

Step 560: determining that the user passes the authentication in response to the biometric feature information of the user matching the authentication reference information and the voice content information matching the voice content reference information.

Step 570: transmitting an authentication result to the user.

The authentication method of the present embodiment may solve the issues of "what do you have" and "what do you know" during the authentication process by comparing the biometric feature information of the user and the authentication reference information and comparing the voice content information and the voice content reference information, such that the risk caused by the information for authentication being forged by a hacker may be lowered.

Figure 6:
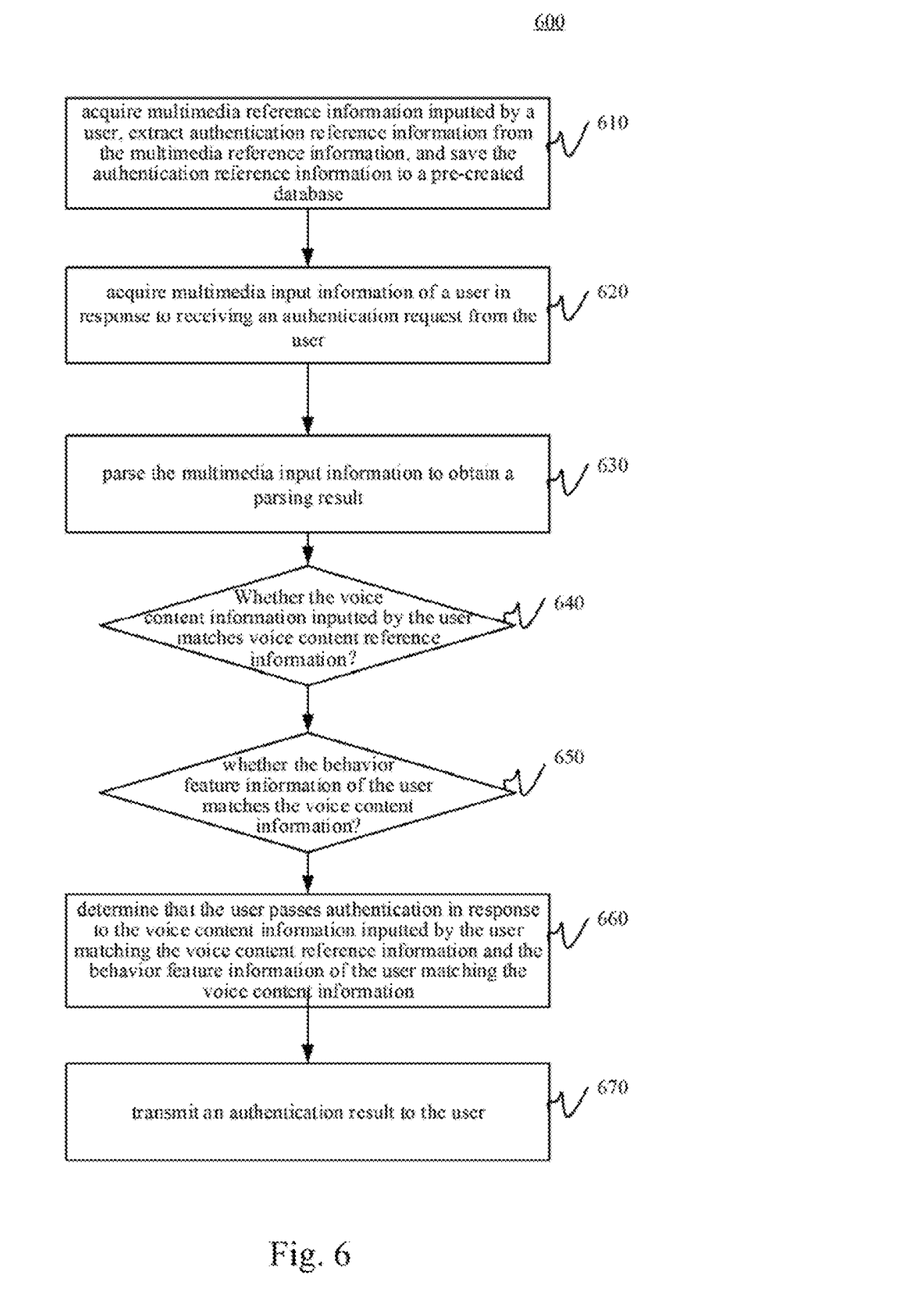
FIG. 6 is schematic flow diagram of a still further embodiment of an authentication method of the present disclosure.

Refer to FIG. 6, which is a schematic flow diagram 600 of a still further embodiment of an authentication method of the present disclosure.

Step 610: acquiring multimedia reference information inputted by a user, extracting authentication reference information from the multimedia reference information, and saving the authentication reference information to a pre-created database.

The executing manner of the present step may be similar to the steps 350~370, which is thus not detailed here. The difference lies in that the authentication reference information of this step further includes voice content reference information.

Step 620: acquiring multimedia input information of a user in response to receiving an authentication request from the user. The executing manner of the present step may be similar to the step 310 in the embodiment of FIG. 3, which is thus not detailed here.

Step 630: parsing the multimedia input information to obtain a parsing result. Different from the embodiment of FIG. 3, the parsing result in the present embodiment includes voice content information and behavior feature information of the user.

Step 640: determining whether the voice content information matches voice content reference information.

Step 650: determining whether the behavior feature information of the user matches the voice content information. For example, in some application scenarios, by executing the step 650, it may be determined whether the user has a relevant lip motion when inputting a voice. In these application scenarios, if the user does not have a relevant lip motion when inputting the voice, it is likely that the authenticated user is "forged" by illegally acquiring the human face image and the pre-agreed "code word" (e.g., voice content reference information) of the user. By executing the present step 650, the hacker may be prevented from passing the authentication when such an occasion occurs.

In addition, in the present embodiment, the step 640 and the step 650 may be executed simultaneously or sequentially, and their executing sequences are not limited.

Step 660: determining that the user passes authentication in response to the voice content information matching the voice content reference information and the behavior feature information of the user matching the voice content information.

Step 670: transmitting an authentication result to the user.

By determining whether the voice content information matches the voice content reference information and determining whether the behavior feature information of the user matches the voice content information, the authentication method of the present embodiment solves the issues of "what do you know" and "how do you behave" in the authentication process, thereby lowering the risk that the information for authentication inputted by the user is easily forged by the hacker in the case of a single authentication ground.

As shown in FIG. 1 of the present disclosure, the authentication method of the present disclosure may be executed by a terminal device (e.g., the electronic device 101 shown in FIG. 1) used by the user.

Figure 7:
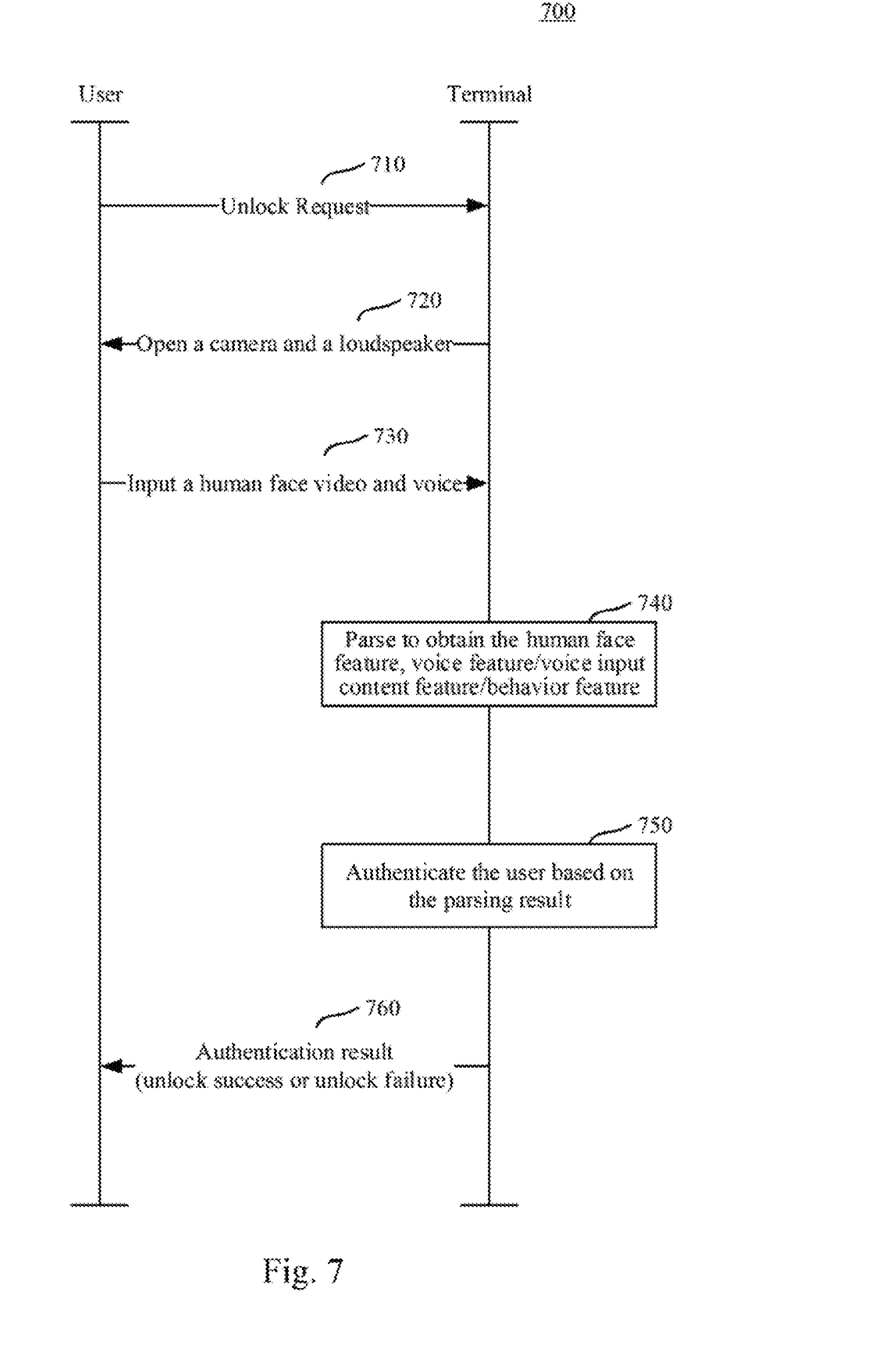
FIG. 7 is a schematic diagram of an application scenario of an authentication method of the present disclosure.

Hereinafter, a process of executing the authentication method of the present disclosure will be schematically described with reference to FIG. 7, where the authentication method is executed by a terminal device.

Suppose a user desires to unlock a terminal device (e.g., a mobile phone) through authentication.

First, the user transmits an unlock request to the terminal, as indicated by reference number 710.

Next, the terminal opens a camera and a loudspeaker, as indicated by reference number 720.

Then, the user inputs a human face video and voice, as indicated by reference number 730. The voice inputted by the user may be a pre-agreed voice "code word," or a voice that is generated by reading characters randomly generated for the current unlock request and presented on an interaction interface of the terminal.

Then, the terminal parses the human face video and voice, thereby obtaining at least two of the human face feature, voice feature/voice input content feature/behavior feature of the user, as indicated by the reference number 740.

Next, the terminal authenticates the user based on the parsing result, as indicated by the reference number 750. For example, determining whether the user has a right to unlock the terminal, or determining a right level of the user to use the terminal (e.g., full-right access, limited-right access, no-right access, etc.).

Next, the terminal feeds back an authentication result to the user, as indicated by the reference number 760.

Through the steps 710~760 above, the process of authentication is completed, and the authentication result is obtained.

In addition, as shown in FIG. 2 of the present disclosure, the authentication method of the present disclosure may be partially executed by a terminal device (e.g., terminal device 201, 202, 203 shown in FIG. 2) used by the user, while the remaining part thereof is executed by a server (e.g., the server 205 shown in FIG. 2).

Figure 8:
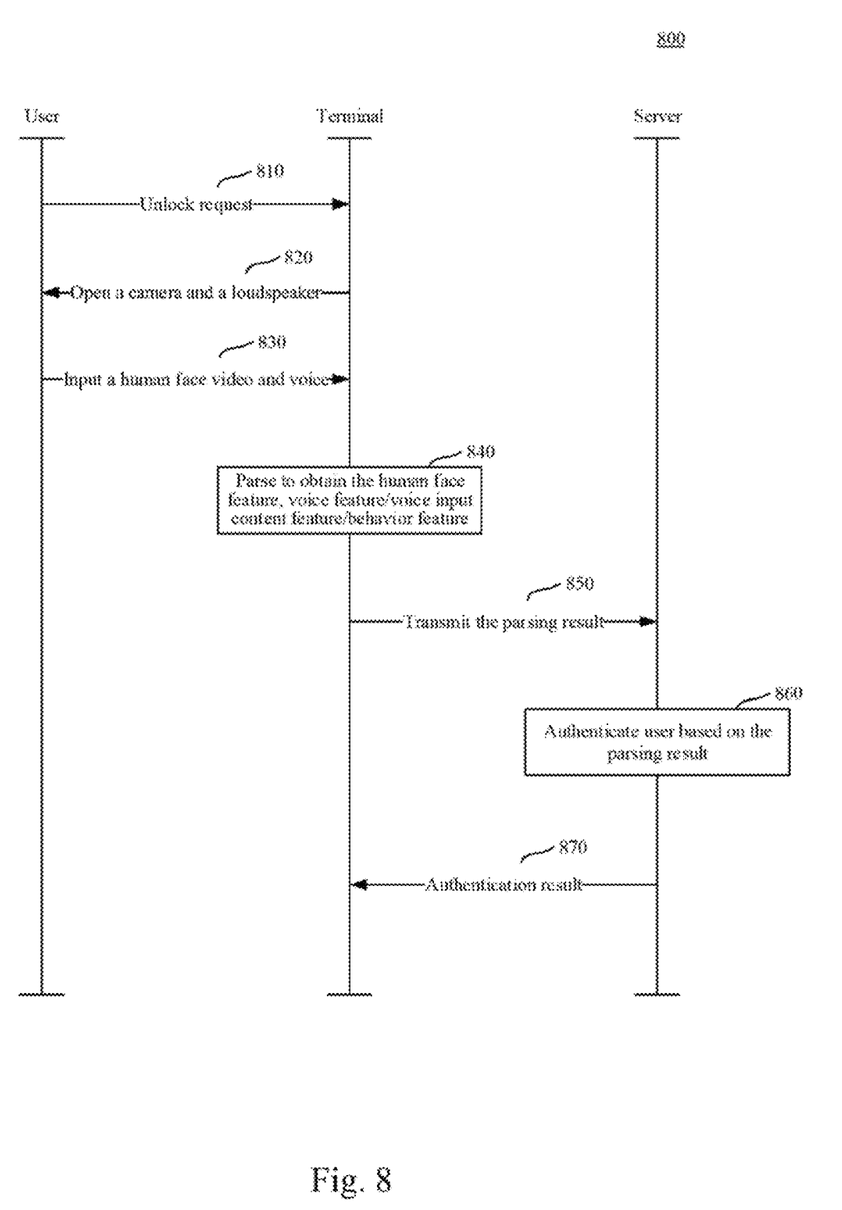
FIG. 8 is a schematic diagram of another application scenario of an authentication method of the present disclosure.

Hereinafter, a process of executing an authentication method of the present disclosure will be schematically described with reference to FIG. 8, wherein the authentication method is partially executed by a terminal, while the remaining part thereof is executed by a server.

Suppose the user desired to access a certain application installed on the terminal device through authentication.

First, the user opens an application desired to access, and transmits an access request through an interaction interface presenting the application on the terminal, as indicated by the reference number 810.

Next, the terminal opens a camera and a loudspeaker, as indicated by the reference number 820.

Then, the user inputs a human face video and voice, as indicated by reference number 830. The voice inputted by the user may be a pre-agreed voice "code word," or a voice that is generated by reading characters randomly generated for the current unlock request and presented on an interaction interface.

Then, the terminal parses a human face video and voice, thereby obtaining at least two of the human face feature, voice feature/voice input content feature/behavior feature of the user, as indicated by the reference number 840.

Next, the terminal transmits the parsing result to the server, available for the server to authenticate, as indicated by the reference number 850. The server for example may provide a service of the application the user desires to access.

Next, the server authenticates the user based on the parsing result, as indicated by the reference number 860.

Next, the server feeds back an authentication result (e.g., a conclusion characterizing whether the user has a right to use the application, or a conclusion characterizing a right level for the user to use the application) to the terminal, as indicated by the reference number 870. After receiving the authentication result, the terminal may transmit the authentication result to the user, e.g., presenting the authentication result on the interface of the application.

Figure 9:
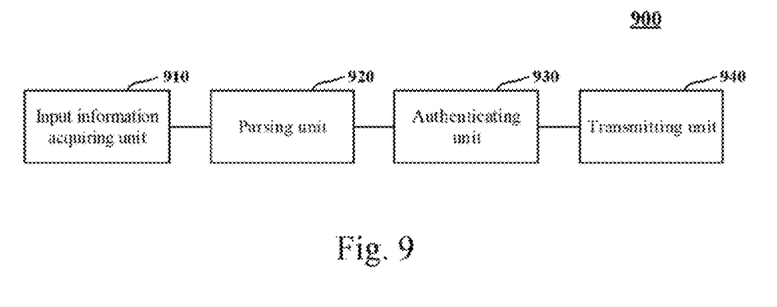
FIG. 9 is a structural diagram of an embodiment of an authentication apparatus of the present disclosure.

Further refer to FIG. 9. As an implementation of the methods shown in the drawings above, the present disclosure provides an embodiment of an authentication apparatus. The apparatus embodiment corresponds to the method embodiment shown in FIG. 2. The apparatus may be specifically applied in various electronic devices.

As shown in FIG. 9, the authentication apparatus 900 of the present embodiment includes an input information acquiring unit 910, a parsing unit 920, an authenticating unit 930, and a transmitting unit 940.

Particularly, the input information acquiring unit 910 may be configured to acquire multimedia input information of a user in response to receiving an authentication request from the user.

The parsing unit 920 may be configured to parse the multimedia input information to obtain a parsing result.

The authenticating unit 930 may be configured to authenticate the user based on the parsing result.

The transmitting unit 940 may be configured to transmit an authentication result to the user.

Particularly, the multimedia input information includes human face video input information and voice input information of the user; and the parsing result includes at least two of the following: biometric feature information of the user, voice content information, and behavior feature information of the user.

Hereinafter, refer to FIG. 10, which shows a structural schematic diagram of a computer system 1000 of an electronic device adapted to implement the embodiments of the present disclosure. The electronic device shown in FIG. 10 is only an example, which should not bring about any limitation to the function or scope of use of the embodiments of the present disclosure.

Figure 10:
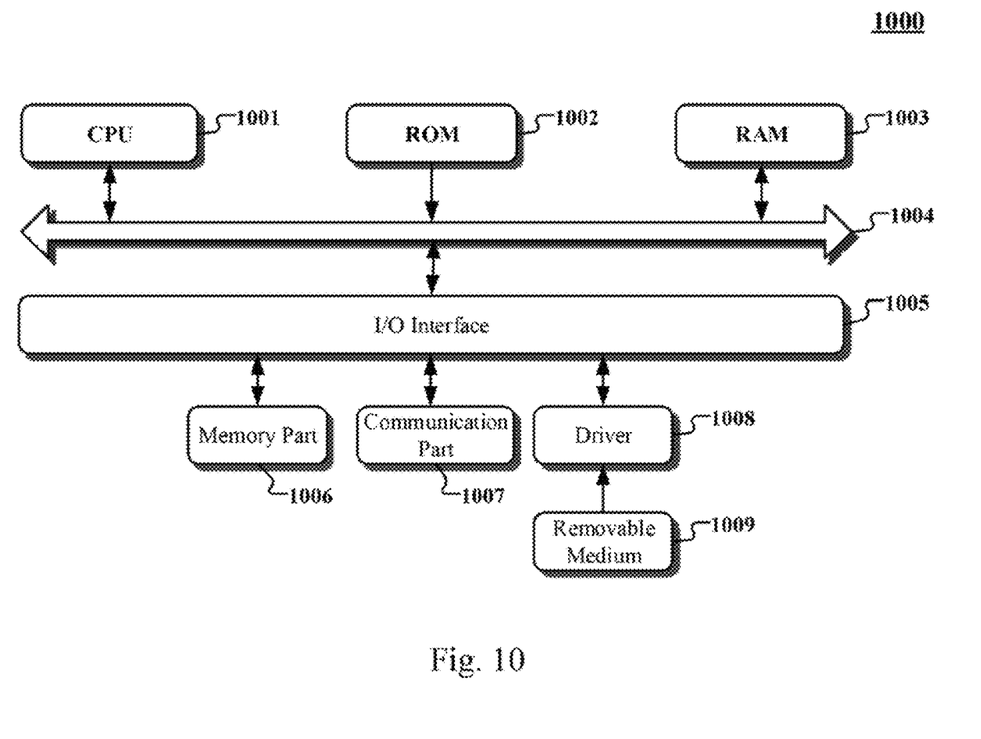
FIG. 10 is a structural schematic diagram of a computer system of an electronic device adapted for implementing embodiments of the present disclosure.

As shown in FIG. 10, the computer system 1000 comprises a central processing unit (CPU) 1001 which may perform various kinds of appropriate actions and processing according to computer program stored in a read-only memory (ROM) 1002 or computer program loaded into the random-access memory (RAM) 1003 from a memory part 1006. In RAM 1003, there may also store various kinds of programs and data needed for operations of the system 1000. CPU 1001, ROM 1002, and RAM 1003 are connected with each other via a bus 1004. The input/output (I/O) interface 1005 may also be connected to the bus 1004.

A plurality of components are connected to the I/O interface 1005, comprising: the memory part 1006 including a hard disk, etc.; and a communication part 1007 including a network interface card such as a LAN (Local Area Network) card, a modem, etc. The communication part 1007 performs communication processing via a network such as the Internet. The driver 1008 is also connected to the I/O interface 1005 as needed. A removable medium 1009, such as a magnetic disk, an optical disk, a magneto-optical disk, and a semiconductor memory, etc., is mounted on the driver 1008 as needed, so as to facilitate the computer program read therefrom to be installed in the memory part 1006.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 1007 and/or installed from the removable medium 1009. When being executed by the central processing unit (CPU) 1001, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program code embodied on the computer-readable medium may be transmitted using any appropriate medium, including, but not limited to: wireless, wired, cable, RF, etc., or any appropriate combination thereof.

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, actually, two successively expressed blocks may be executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising an input information acquiring unit, a parsing unit, an authenticating unit, and a transmitting unit. Particularly, names of these units do not constitute limitations to those units. For example, the input information acquiring unit may also be described as "a unit that acquires multimedia input information of a user in response to receiving an authentication request from the user."

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: acquire multimedia input information of a user in response to receiving an authentication request from the user; parse the multimedia input information to obtain a parsing result; authenticate the user based on the parsing result; and transmit an authentication result to the user; wherein the multimedia input information includes human-face video input information and voice input information of the user; and the parsing result includes at least two of: biometric feature information of the user, voice content information, and behavior feature information of the user.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. An authentication method, comprising:
   extracting authentication reference information from multimedia reference information inputted by a user;
   receiving an authentication request from the user;
   randomly generating voice reference information and presenting the voice reference information on an interaction interface;
   acquiring multimedia input information of the user when the user reads the randomly generated voice reference information;
   parsing the multimedia input information to obtain a parsing result;
   authenticating the user based on the parsing result; and
   transmitting an authentication result to the user;
   wherein the multimedia input information includes human face video input information and voice input information of the user; and
   the parsing result includes biometric feature information of the user, voice content information, and behavior feature information of the user;
   the authenticating the user based on the parsing result comprises:
      determining whether the biometric feature information of the user matches the authentication reference information;
      determining whether the behavior feature information of the user matches the voice input information;
      determining whether the voice content information matches voice content reference information in the authentication reference information; and
      determining that the user passes authentication in response to the biometric feature information of the user matching the authentication reference information, the behavior feature information of the user matching the voice input information, and the voice content information matching the voice content reference information;
   wherein the behavior feature information of the user includes lip motion feature information of the user, and
   wherein the parsing the multimedia input information to obtain a parsing result comprises:
      inputting the human face video input information into a pre-trained lip motion feature extracting model to obtain the lip motion feature information of the user; and inputting the voice input information into a pre-trained voice content feature extracting model to obtain voice content feature information of the user, and
   wherein the determining whether the behavior feature information of the user matches the voice input information comprises:
      determining whether the lip motion feature information matches the voice content feature information.

2. The method according to claim 1, further comprising, before receiving the authentication request from the user, saving the authentication reference information in a pre-created database.

3. The method according to claim 1, wherein
   the multimedia reference information includes human-face reference image information of the user and voice reference information of the user; and
   the authentication reference information includes human face feature reference information of the user and/or voice feature reference information of the user.

4. The method according to claim 1, wherein:
   the parsing result includes the biometric feature information of the user and the voice content information;
   the authentication reference information further includes the voice content reference information, and
   wherein the authenticating the user based on the parsing result comprises:
      determining whether the biometric feature information of the user matches the authentication reference information;
      determining whether the voice content information matches the voice content reference information; and
      determining that the user passes authentication in response to the biometric feature information of the user matching the authentication reference information and the voice content information matching the voice content reference information.

5. The method according to claim 1, wherein:
   the parsing result includes the voice content information and the behavior feature information of the user;
   the authentication reference information further includes the voice content reference information, and
   wherein the authenticating the user based on the parsing result comprises:
      determining whether the voice content information matches the voice content reference information;
      determining whether the user behavior information of the user matches the voice content information; and determining that the user passes authentication in response to the voice content information matching the voice content reference information and the behavior feature information of the user matching the voice content information.

6. The method according to claim 1, wherein:
the authenticating the user based on the parsing result comprises:
   transmitting the parsing result to a server such that the server authenticates the user based on the parsing result, and
   wherein the transmitting an authenticating result to the user comprises:
      receiving the authentication result transmitted by the server and transmitting the received authentication result to the user.

7. An electronic device, comprising:
one or more hardware processors;
a memory storing one or more programs which, when being executed by the one or more processors, cause the one or more processors to perform operations, the operations comprising:
   extracting authentication reference information from multimedia reference information inputted by a user;
   receiving an authentication request from the user;
   randomly generating voice reference information and presenting the voice reference information on an interaction interface;
   acquiring multimedia input information of the user when the user reads the randomly generated voice reference information;
   parsing the multimedia input information to obtain a parsing result;
   authenticating the user based on the parsing result; and
   transmitting an authentication result to the user;
   wherein the multimedia input information includes human face video input information and voice input information of the user; and
   the parsing result includes biometric feature information of the user, voice content information, and behavior feature information of the user;
   the authenticating the user based on the parsing result comprises:
      determining whether the biometric feature information of the user matches the authentication reference information;
      determining whether the behavior feature information of the user matches the voice input information;
      determining whether the voice content information matches voice content reference information in the authentication reference information; and
      determining that the user passes authentication in response to the biometric feature information of the user matching the authentication reference information, the behavior feature information of the user matching the voice input information, and the voice content information matching the voice content reference information;
   wherein the behavior feature information of the user includes lip motion feature information of the user, and
   wherein the parsing the multimedia input information to obtain a parsing result comprises:
      inputting the human face video input information into a pre-trained lip motion feature extracting model to obtain the lip motion feature information of the user; and inputting the voice input information into a pre-trained voice content feature extracting model to obtain voice content feature information of the user, and
   wherein the determining whether the behavior feature information of the user matches the voice input information comprises:
      determining whether the lip motion feature information matches the voice content feature information.

8. A non-transitory computer readable storage medium having a computer program embodied thereon, wherein the computer program, when being executed by a processor, causes the processor to perform operations, the operations comprising:
   extracting authentication reference information from multimedia reference information inputted by a user;
   receiving an authentication request from the user;
   randomly generating voice reference information and presenting the voice reference information on an interaction interface;
   acquiring multimedia input information of the user when the user reads the randomly generated voice reference information;
   parsing the multimedia input information to obtain a parsing result;
   authenticating the user based on the parsing result; and
   transmitting an authentication result to the user;
   wherein the multimedia input information includes human face video input information and voice input information of the user; and
   the parsing result includes biometric feature information of the user, voice content information, and behavior feature information of the user;
   the authenticating the user based on the parsing result comprises:
      determining whether the biometric feature information of the user matches the authentication reference information;
      determining whether the behavior feature information of the user matches the voice input information;
      determining whether the voice content information matches voice content reference information in the authentication reference information; and
      determining that the user passes authentication in response to the biometric feature information of the user matching the authentication reference information, the behavior feature information of the user matching the voice input information, and the voice content information matching the voice content reference information;
   wherein the behavior feature information of the user includes lip motion feature information of the user, and
   wherein the parsing the multimedia input information to obtain a parsing result comprises:
      inputting the human face video input information into a pre-trained lip motion feature extracting model to obtain the lip motion feature information of the user; and inputting the voice input information into a pre-trained voice content feature extracting model to obtain voice content feature information of the user, and
   wherein the determining whether the behavior feature information of the user matches the voice input information comprises:

determining whether the lip motion feature information matches the voice content feature information.

\* \* \* \* \*